(12) United States Patent
Dellaripa et al.

(10) Patent No.: US 10,152,753 B2
(45) Date of Patent: Dec. 11, 2018

(54) MEDICAL RISK UNDERWRITING SYSTEM

(71) Applicant: Hartford Fire Insurance Company, Hartford, CT (US)

(72) Inventors: David F. Dellaripa, Tolland, CT (US); Aubrey T Heilman, Hartford, CT (US); Gary Robbins, Cave Creek, AZ (US)

(73) Assignee: Hartford Fire Insurance Company, Hartford, CT (US)

( * ) Notice: Subject to any disclaimer, the term of this patent is extended or adjusted under 35 U.S.C. 154(b) by 705 days.

(21) Appl. No.: 14/516,020

(22) Filed: Oct. 16, 2014

(65) Prior Publication Data

US 2016/0110815 A1    Apr. 21, 2016

(51) Int. Cl.
- *G06Q 40/08* (2012.01)
- *G06Q 50/22* (2018.01)

(52) U.S. Cl.
CPC ............. *G06Q 40/08* (2013.01); *G06Q 50/22* (2013.01)

(58) Field of Classification Search
None
See application file for complete search history.

(56) References Cited

U.S. PATENT DOCUMENTS

| | | | | |
|---|---|---|---|---|
| 4,975,840 A | * | 12/1990 | DeTore | G06F 19/328 705/4 |
| 5,107,419 A | * | 4/1992 | MacPhail | G06F 17/30011 700/83 |
| 6,264,108 B1 | * | 7/2001 | Baentsch | G06K 19/073 235/380 |
| 6,324,650 B1 | * | 11/2001 | Ogilvie | G06F 21/6209 726/2 |
| 6,725,444 B2 | * | 4/2004 | Fergus | G06F 21/6209 717/100 |
| 7,152,244 B2 | * | 12/2006 | Toomey | G06F 21/57 726/26 |
| 7,249,040 B1 | | 7/2007 | Binns et al. | |
| 7,363,326 B2 | * | 4/2008 | Margolus | G06F 17/30368 380/44 |
| 7,555,438 B2 | | 6/2009 | Binns et al. | |
| 7,555,439 B1 | | 6/2009 | Binns et al. | |
| 7,831,451 B1 | | 11/2010 | Morse et al. | |
| 7,917,963 B2 | * | 3/2011 | Goyal | G06F 21/6209 726/29 |
| 8,112,807 B2 | * | 2/2012 | Taylor | G06F 21/88 726/26 |

(Continued)

*Primary Examiner* — Narayanswamy Subramanian
*Assistant Examiner* — Christopher Bridges
(74) *Attorney, Agent, or Firm* — Howard IP Law Group

(57) ABSTRACT

According to some embodiments, systems, methods, apparatus, computer program code and means may display information from a medical risk factor computer storage unit. Information associated with an insurance policy, having an insurance policy identifier, may then be received from an underwriter along with a plurality of medical risk factor values for the insurance policy. The plurality of medical risk factor values may be stored into an insurance policy storage unit in association with the insurance policy identifier. An overall risk level associated with the insurance policy may be automatically calculated based on the plurality of medical risk factor values, and at least one file may be locally saved associating overall risk level with the insurance policy identifier and/or medical risk factor values.

12 Claims, 15 Drawing Sheets

(56) References Cited

U.S. PATENT DOCUMENTS

| | | | | |
|---|---|---|---|---|
| 9,600,685 | B2* | 3/2017 | Cherel | G06F 21/6227 |
| 2002/0087364 | A1* | 7/2002 | Lerner | G06Q 40/08 |
| | | | | 705/4 |
| 2003/0187700 | A1* | 10/2003 | Bonissone | G06Q 40/00 |
| | | | | 705/4 |
| 2003/0208385 | A1* | 11/2003 | Zander | G06Q 40/08 |
| | | | | 705/4 |
| 2006/0129914 | A1* | 6/2006 | Ellis | G06F 17/246 |
| | | | | 715/275 |
| 2007/0015490 | A1* | 1/2007 | Munje | H04M 1/66 |
| | | | | 455/410 |
| 2008/0301820 | A1* | 12/2008 | Stevens | H04L 63/0846 |
| | | | | 726/28 |
| 2009/0158441 | A1* | 6/2009 | Mohler | G06F 21/552 |
| | | | | 726/27 |
| 2009/0210256 | A1 | 8/2009 | Upadhyayula et al. | |
| 2010/0169758 | A1* | 7/2010 | Thomsen | G06F 17/246 |
| | | | | 715/212 |
| 2014/0006039 | A1* | 1/2014 | Khan | G06Q 50/22 |
| | | | | 705/2 |
| 2014/0278588 | A1* | 9/2014 | Burgoon, Jr. | G06Q 40/08 |
| | | | | 705/4 |
| 2015/0081319 | A1* | 3/2015 | Kemp | G06Q 50/22 |
| | | | | 705/2 |

* cited by examiner

MEDICAL RISK UNDERWRITING SYSTEM

SPREADSHEET APPLICATION – RATE SUMMARY

RATE SUMMARY

TODAY'S DATE: AUGUST 20, 2018

NAME: JANE DOE
DATE OF BIRTH: DECEMBER 12, 1970

BODY MASS INDEX: 36
BLOOD PRESSURE: 130/80

OTHER RATABLE CONDITIONS:
ESSENTIAL HYPERTENSION
ADMITTED HISTORY, NO KNOW COMPLICATIONS

| | DEBITS |
|---|---|
| | 25 |
| | 0 |

CUMULATIVE DEBITS     STD     25

MAIN TABLE OF CONTENTS

- INTRODUCTION (HEIGHT/WEIGHT)
- INDEX
- BLOOD PRESSURE, HYPERTENSION
- CARDIOLOGY
- DIGESTIVE
- EAR, EYE, NOSE, & THROAT
- MISCELLANEOUS
- NEUROLOGY & PSYCHIATRY
- ONCOLOGY & TUMORS
- RATE SUMMARY
- SEARCH
- DEBIT CALCULATOR

FIG. 8

MEDICAL RISK UNDERWRITING SYSTEM

SPREADSHEET APPLICATION – BASIC INFORMATION

MEDICAL RISK FACTOR INDEX

– A –

ABNORMAL REFLEX
ABSCESSES
ACOUSTIC NEUROMA
ADDISON'S DISEASE
ADJUSTMENT DISORDER
ADRENAL GANGLOG
ADULT RESPIRATOR
ALBUMINURIA
ALCOHOL ABUSE
ALCOHOLISM
ALLERGIES
ALVEOLAR PROTEINOSIS
ALZHEIMER'S DISEASE
AMNESIA (LOSS OF MEMORY)
AMPUTATION
AMYLOIDOSIS

PLEASE ENTER PASSWORD:

WARNING: THE LAST PASSWORD YOU USED IS SET TO EXPIRE IN *TWO WEEKS*. ALL DATA WILL BE AUTOMATICALLY DELETED. PLEASE CONTACT THE INSURER TO OBTAIN A NEW PASSWORD

1410

MAIN TABLE OF CONTENTS

INTRODUCTION (HEIGHT/WEIGHT)
INDEX
BLOOD PRESSURE, HYPERTENSION
CARDIOLOGY
DIGESTIVE
EAR, EYE, NOSE, & THROAT
MISCELLANEOUS
NEUROLOGY & PSYCHIATRY
ONCOLOGY & TUMORS
RATE SUMMARY
SEARCH
DEBIT CALCULATOR

MEDICAL RISK UNDERWRITING SYSTEM

FIELD

The present invention relates to computer systems and more particularly to computer systems that associated with medical risk underwriting decisions for an insurance policy.

BACKGROUND

An underwriter may evaluate risks associated with a potential insurance policy. For example, the underwriter might consider various medical risk factors associated with an applicant's potential life insurance policy. There are, however, a substantial number of factors that may need to be considered by the underwriter. In some cases, a printed manual is provided to help underwriters evaluate medical risk factors. In this way, underwriters can look up various medical conditions to learn about risks associated with those conditions. Such an approach, can be time consuming that the underwriter may need to manually copy risk information and/or manually calculate certain values (e.g., an applicant's average blood pressure) before he or she can determine an overall amount of risk associated with the potential insurance policy. Moreover, manually creating a letter to notify an applicant of an underwriting decision (e.g., informing the applicant that his or her application has been denied). Note that transmitting this type of information over a network, such as by transmitting the information to a web site via the Internet, may not provide a level of security and privacy that is appropriate for an applicant's medical information.

It would therefore be desirable to provide systems and methods to facilitate medical risk underwriting decisions for a potential insurance policy in an automated, efficient, and accurate manner.

SUMMARY

According to some embodiments, systems, methods, apparatus, computer program code and means may facilitate medical risk underwriting decisions for an insurance policy. In some embodiments, systems, methods, apparatus, computer program code and means may display information from a medical risk factor computer storage unit or database. Information associated with an insurance policy, having an insurance policy identifier, may then be received from an underwriter along with a plurality of medical risk factor values for the insurance policy. The plurality of medical risk factor values may be stored into an insurance policy storage unit in association with the insurance policy identifier. An overall risk level associated with the insurance policy may be automatically calculated based on the plurality of medical risk factor values, and a file may be locally saved associating the overall risk level with the insurance policy identifier and/or plurality of medical risk factor values.

A technical effect of some embodiments of the invention is an improved and computerized method to facilitate medical risk underwriting decisions for an insurance policy. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 8 is an example of a rate summary display according to some embodiments.

FIG. 14 is an example of password display in accordance with some embodiments.

DETAILED DESCRIPTION

Figure 1:
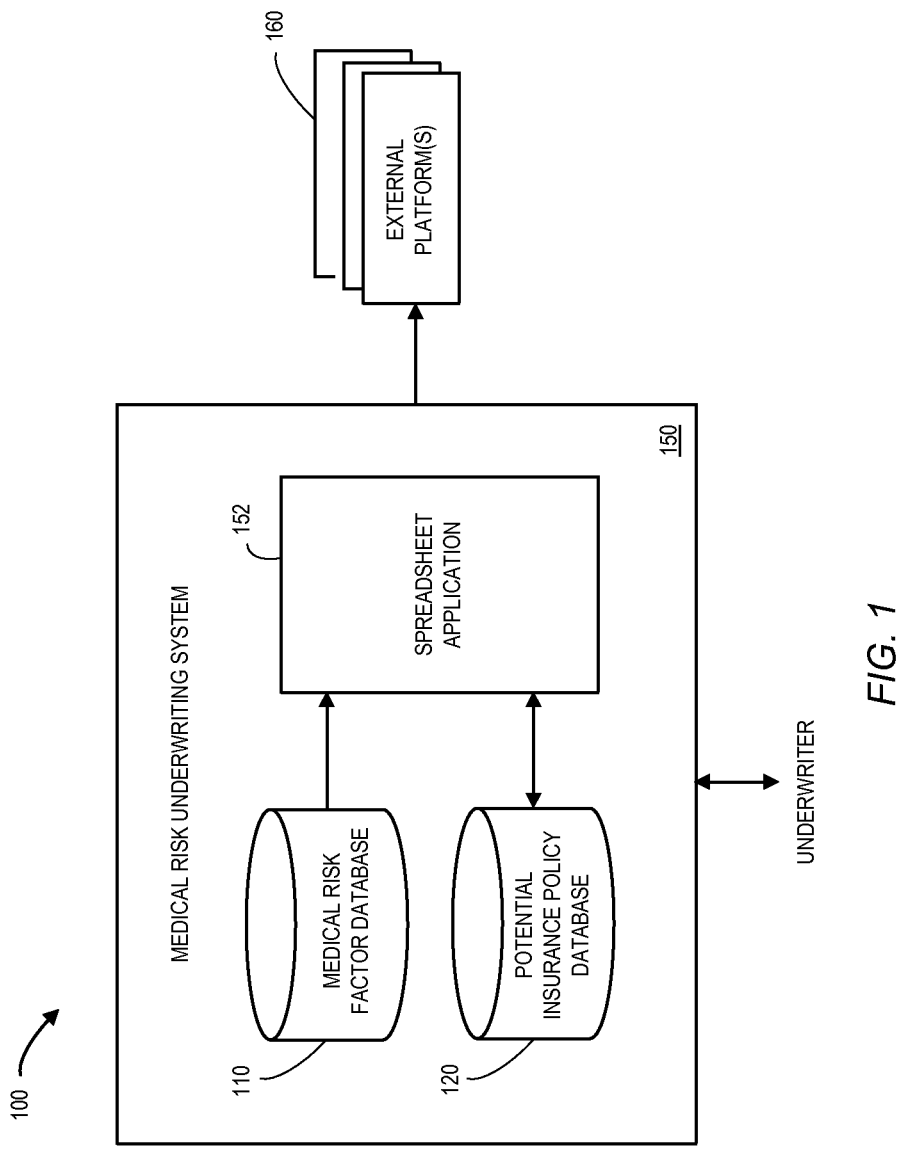
FIG. 1 is block diagram of a system according to some embodiments of the present invention.

Some embodiments described herein may facilitate medical risk underwriting decisions for an insurance policy. Further, some embodiments may provide a mechanism that automates a user interface that might be used, for example, by an underwriter in connection with a life insurance policy. FIG. 1 is block diagram of a system 100 according to some embodiments of the present invention. In particular, the system 100 includes a medical risk underwriting system 150 that receives information from a medical risk factor database 110 (e.g., which may store detailed information of various medical risks associated with blood pressure disorders, digestive diseases, cancers, etc.) and stores information into and receives information from a potential insurance policy database 120 (e.g., associated with one or more life insurance policy applications being examined by an underwriter).

The medical risk underwriting system 150 might be, for example, associated with a Personal Computers (PC), a spreadsheet application 152 such as the EXCEL® spreadsheet application available from MICROSOFT CORPORATION® (e.g., including spreadsheet workbooks and/or templates), a laptop computer, an enterprise server, a server farm, and/or a database or similar storage devices. The medical risk underwriting system 150 may, according to some embodiments, be associated with an insurance provider. Note a spreadsheet application is not the only way of implementing the medical risk underwriting system 150 and embodiments might instead be configured using Visual Basic, Java, HyperText Markup Language ("HTML") protocols, etc.

According to some embodiments, an "automated" medical risk underwriting system 150 may help underwriter make appropriate underwriting decisions in connection with various medical risk factors. For example, the medical risk underwriting system 150 may automatically output an appropriate suggestion of a level of risk associated with a particular illness via a graphical user interface display. As used herein, the terms "automated" and "automatically" may refer to, for example, actions that can be performed with little (or no) intervention by a human.

As used herein, devices, including those associated with the medical risk underwriting system 150 and any other device described herein, may exchange information via any communication network which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The medical risk underwriting system 150 may store information into and/or retrieve information from the databases 110, 120. The databases 110, 120 might be associated with, for example, an insurance provider or insurer. The databases 110, 120 might be locally stored within the medical risk underwriting system 150. According to some embodiments, the medical risk underwriting system 150 communicates information, such as by transmitting an electronic file or signal to an external platform 160 associated with an underwriter display, a printer, an insurance agent or analyst platform, an email server, a workflow management system, etc.

Although a single medical risk underwriting system 150 is shown in FIG. 1, any number of such devices may be included. Moreover, various devices described herein might be combined according to embodiments of the present invention. For example, in some embodiments, the medical risk underwriting system 150 and databases 110, 120 are co-located and/or may comprise a single apparatus.

Figure 2:
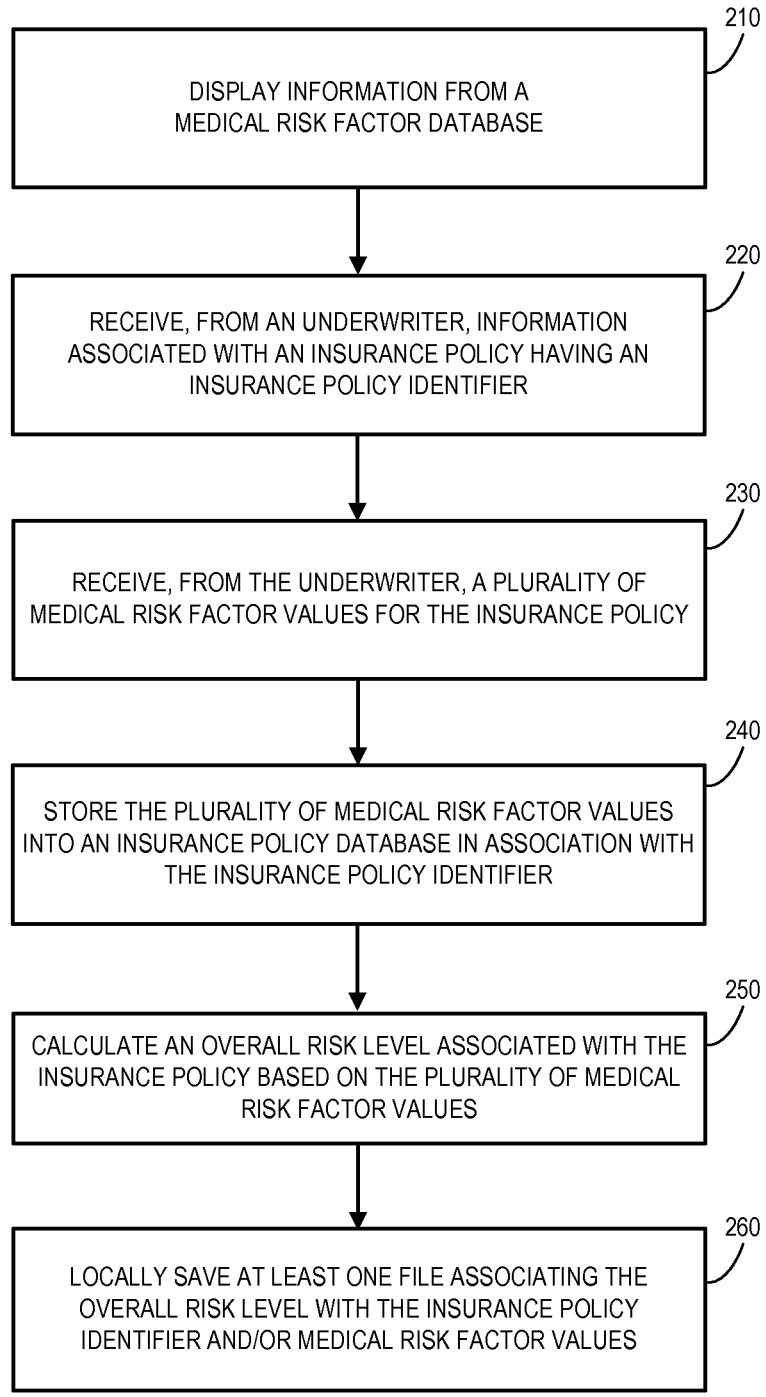
FIG. 2 illustrates a method that might be performed in accordance with some embodiments.

FIG. 2 illustrates a method that might be performed by some or all of the elements of the system 100 described with respect to FIG. 1 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 210, information from a medical risk factor computer storage unit may be displayed. For example, information about various medical disorders may be display along with guidelines, suggestions, and/or rules indicating an amount of risk that may be associated with each disorder. According to some embodiments, a medical risk factor computer storage unit, an insurance policy storage unit, and/or a processor executing the method of FIG. 2 are associated with a spreadsheet application. In this case, spreadsheet formulas, tabs, workbooks, etc. may facilitate the display of medical risk factor information. According to some embodiments, information from the medical risk factor storage unit is displayed based at least in part on a "text characteristic" of the medical risk factor data. As used herein the phrase "text characteristic" might refer to, for example, a font, a font size, bold text, underlined text, italicized text, a text color, and/or a text indentation. By way of example, all text stored using a bold-face font might be extracted and used in a table of contents display. As another example, strings of text stored using an underline font might be included in a drop-menu and be selectable by the underwriter (e.g., so he or she can request to view more information about a particular disorder).

At 220, information associated with an insurance policy may be received from an underwriter. The insurance policy might comprise, for example, a new potential life insurance policy, a life insurance policy renewal, and/or a group life insurance policy. By way of example, the underwriter might provide some basic information about an application, such as a name, gender, date of birth, height, weight, blood pressure values, etc. According to some embodiments, this information is associated with an insurance policy "identifier." The identifier might be used, for example, to store and later retrieve the information. Examples of such identifiers might include a policy number, a potential policyholder name, a potential applicant name, a client name, a date of data entry, a date of a file save, a date of birth, and/or a client number.

At 230, a plurality of medical risk factor values for the insurance policy are received from the underwriter. For example, the underwriter might indicate that a particular applicant had a history of hypertension. According to some embodiments, the medical risk underwriting system may display to the underwriter a suggested medical risk factor value. In this case, the underwriter might decide to accept or adjust the suggested medical risk factor value. At 240, the plurality of medical risk factor values are stored into the insurance policy storage unit in association with the insurance policy identifier. For example, the values may be stored by the underwriter as a file on his or her PC. This may allow the underwriter to later retrieve the information (e.g., when he or she returns to work the next day). This may also let an underwriter work on several different insurance applications (each having its own save file).

At 250, an "overall risk level" associated with the insurance policy may be automatically calculated based on the plurality of medical risk factor values. Note that an overall risk level might be, for example, an overall risk score (e.g., 0 through 100), an overall risk category (e.g., "acceptable" or "unacceptable"), or amounts of risk credits and risk debits that might added to determine an overall level of risk. At 260, at least one file may be locally saved associating the overall risk level with the insurance identifier and/or the plurality of medical risk factor values. According to some embodiments, an indication of the overall risk level may be transmitted, such as by transmitting an electronic file or signal to an external platform associated with an underwriter display, a printer, an insurance agent or analyst platform, an email server, a workflow management system, etc.

According to some embodiments, a medical risk underwriting system 150 may automatically generate a recommended underwriting decision based on the overall risk level. Based on the recommended underwriting decision, the system may use a template in an external application (e.g., the WORD® word processing application from MICROSOFT CORPORATION®) to automatically create a customized decision document including at least some of the insurance policy data.

Figure 3:
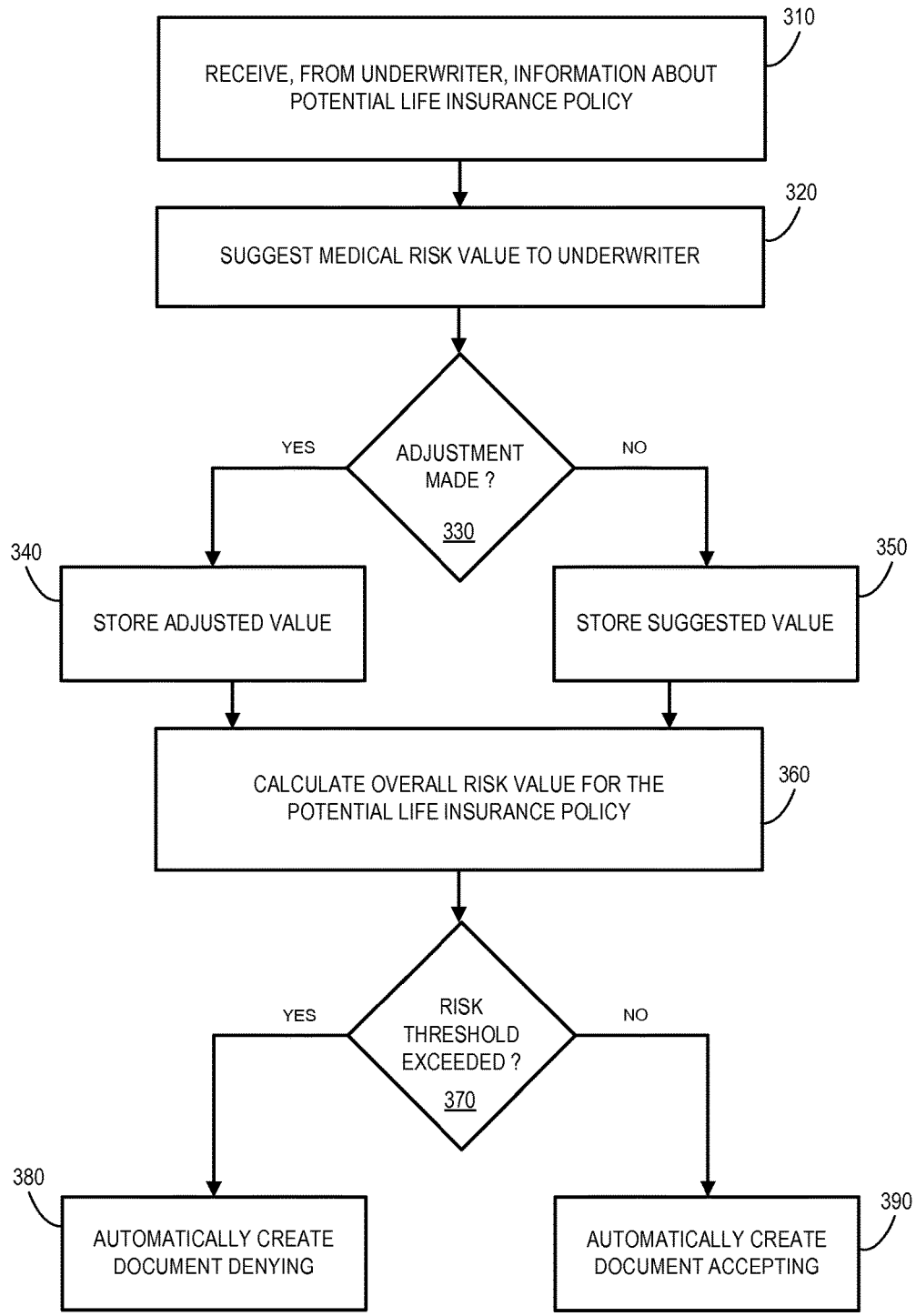
FIG. 3 illustrates an underwriting method that might be performed in accordance with some embodiments.

FIG. 3 illustrates an underwriting method that might be performed in accordance with some embodiments. At 310, information about a potential life insurance policy may be received from an underwriter. For example, the underwriter might enter a birthdate, height, and weight of an applicant for an insurance policy. At 320, the medical risk underwriting system may suggest a medical risk value to the underwriter. For example, the system might suggest that the applicant's Body Mass Index ("BMI") should be associated with 25 debit points (due to the elevated level of risk associated with that BMI value). If the underwriter adjusts the suggested value at 330, the adjusted value is stored at 340. If the underwriter does not adjust that value at 330, the originally suggest value is stored at 350. This process may be repeated for many different medical risks as appropriate. The medical risk underwriting system may then calculate an overall risk value for the potential life insurance policy at 360. If the risk exceeds a predetermined threshold at 370, the system may automatically create a document at 380, such as a draft letter to applicant explaining why his or her application is being denied. If the risk does not exceed the predetermined threshold at 370, the system may automatically create a document at 390, such as a draft letter to applicant indicating that his or her application for life insurance has been accepted.

Figure 4:
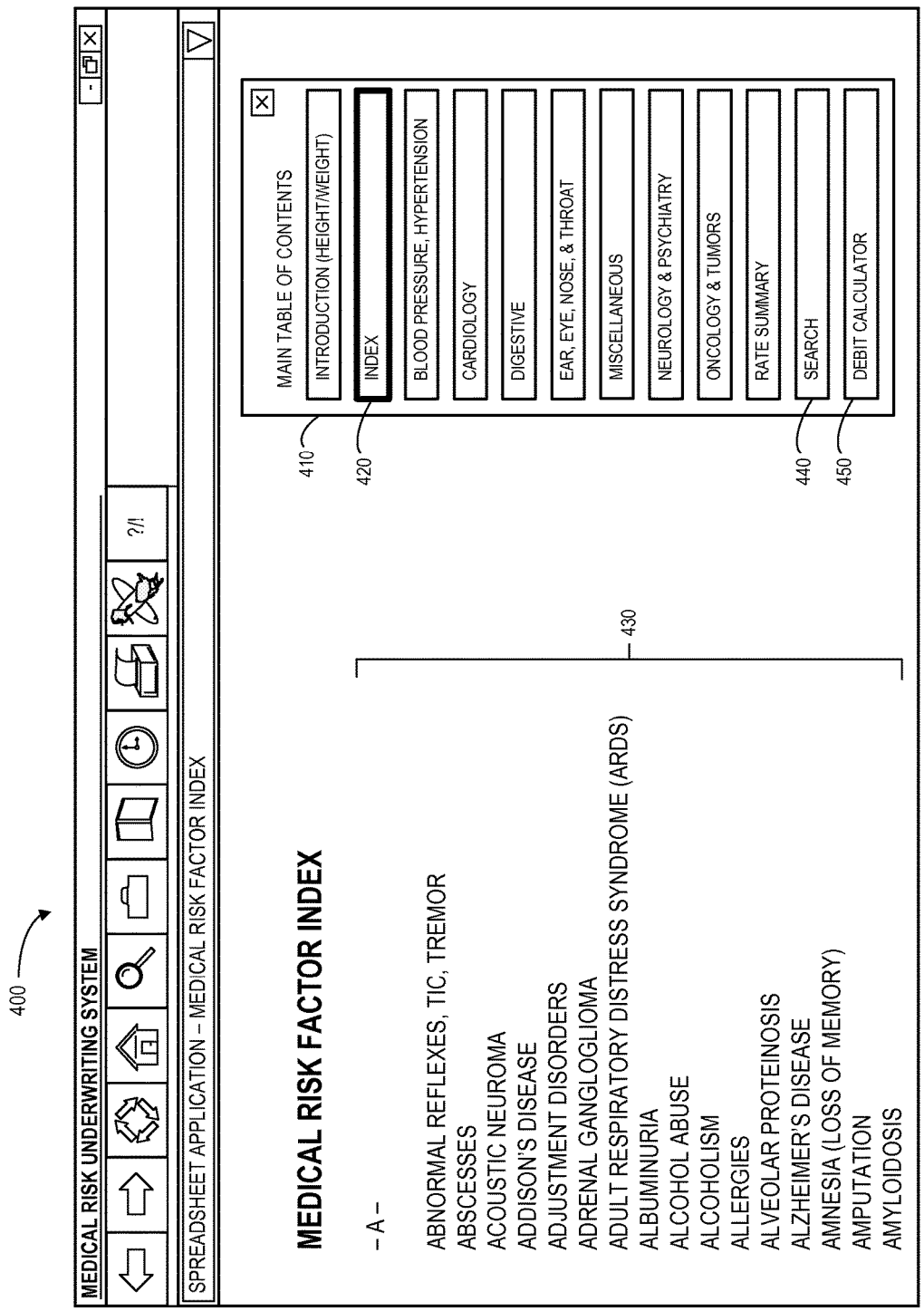
FIG. 4 is an example of a medical risk factor index display according to some embodiments.

FIG. 4 is an example of a medical risk factor index display 400 according to some embodiments. The medical risk factor index display 400 includes a main table of contents 410 listing different categories 420 of medical conditions that can be accessed by the underwriter. According to some embodiments, different categories may be associated with different tabs of a spreadsheet application file. By way of example, selection of the "Index" category 420 result in an alphabetical medical risk factor index 430 being displayed to the underwriter. The underwriter may then select entries in the index 430 to see more information about that particular topic (e.g., providing details about the level of risk associated with that type of medical disorder). According to some embodiments, the main table of contents 410 also includes a "search" icon 440 selectable by the underwriter. In this case, he or she could enter text and the system may automatically locate that text. According to some embodiments, the main table of contents 410 also includes a "debit calculator" icon 450 selectable by the underwriter to view, enter, and/or adjust risk information.

Figure 5:
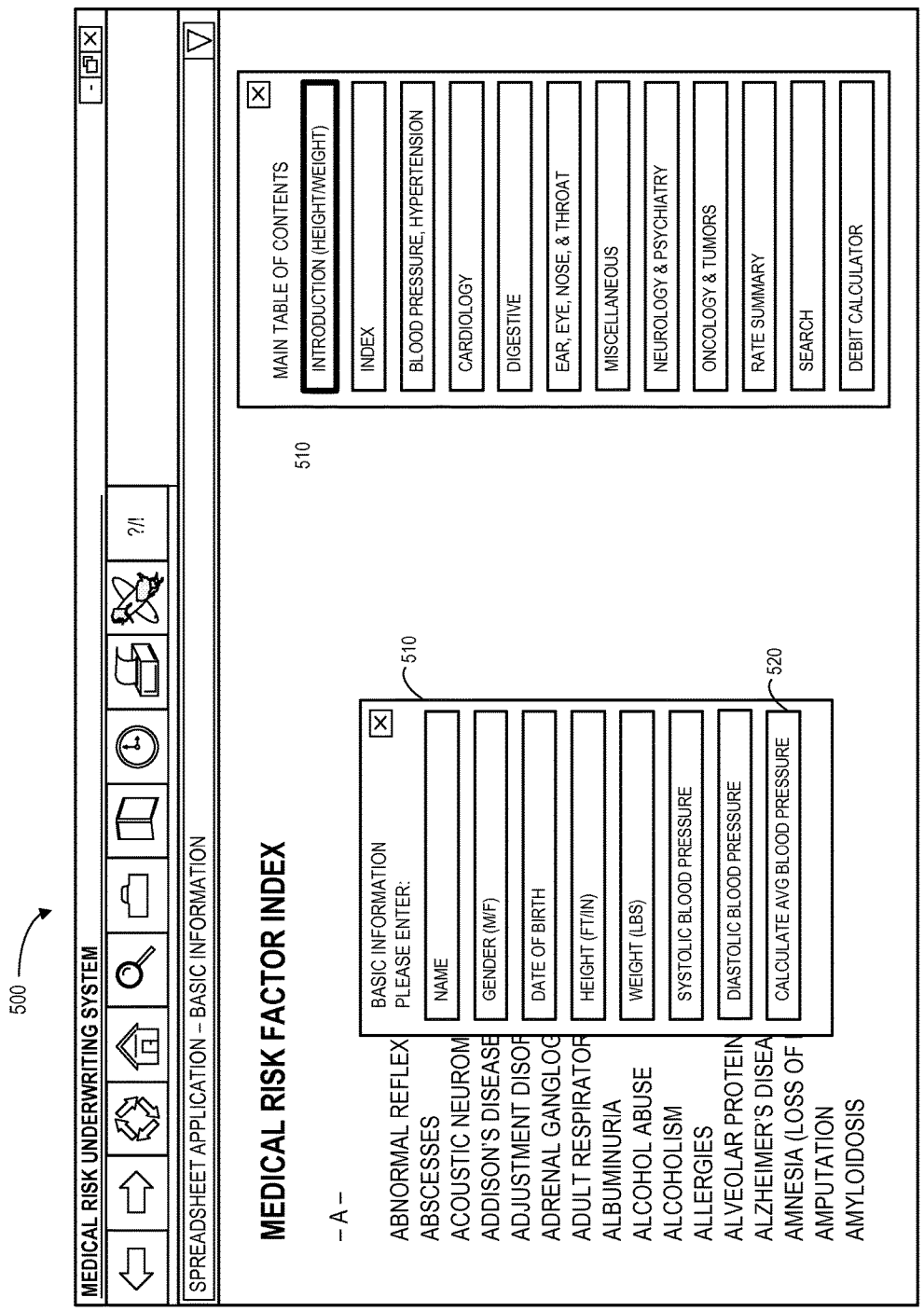
FIG. 5 is an example of a basic information display in accordance with some embodiments.

Selection of the "Introduction" category 420 of the main table of contents 410 may result in display of a basic information display. For example, FIG. 5 is an example of a basic information display 500 in accordance with some embodiments. The display 500 include a pop-up data entry window 510 that can be used by an underwriter to provide an applicant's name, gender, date of birth, height, and weight. According to some embodiments, these values can be saved and later retrieved by the underwriter (e.g., so he or she does not have to re-enter the information). The data entry window 510 may also include blood pressure values (e.g., systolic and diastolic blood pressure values).

Figure 6:
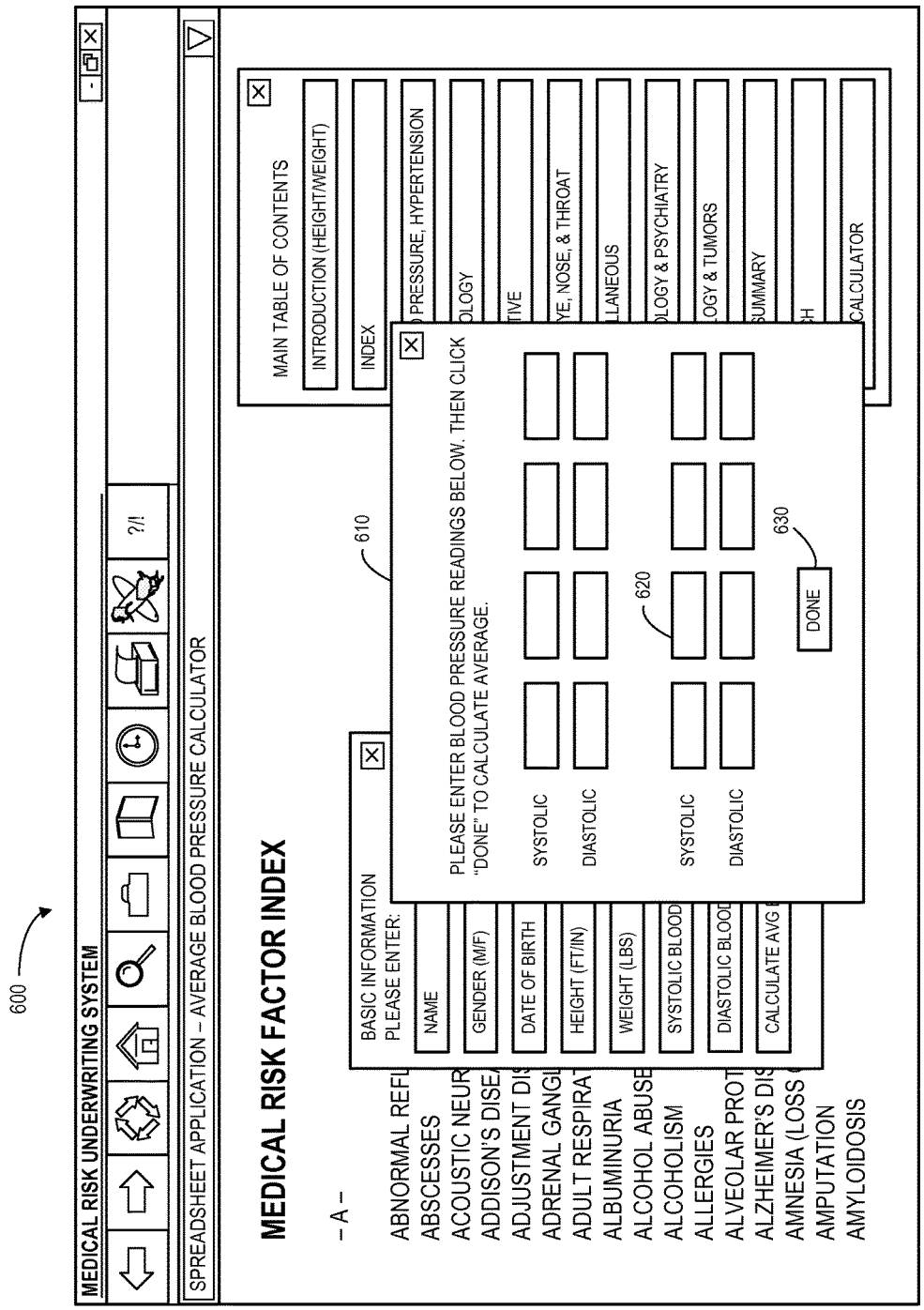
FIG. 6 is an example of an average blood pressure calculator display according to some embodiments.

According to some embodiments, selection of the "Calculate Average Blood Pressure" icon 520 of the date entry window 510 results in display of an average blood pressure calculator. For example, FIG. 6 is an example of an average blood pressure calculator display 600 according to some embodiments. In this example, a calculator 610 may include data entry areas 620 where the underwriter can enter blood pressure values as appropriate. Selection of the "Done" icon 630 by the underwriter may cause the system to calculate the average of the entered values (and the information may be automatically populated in the pop-up data entry window 510 of the basic information display 500 illustrated in FIG. 5.

Figure 7:
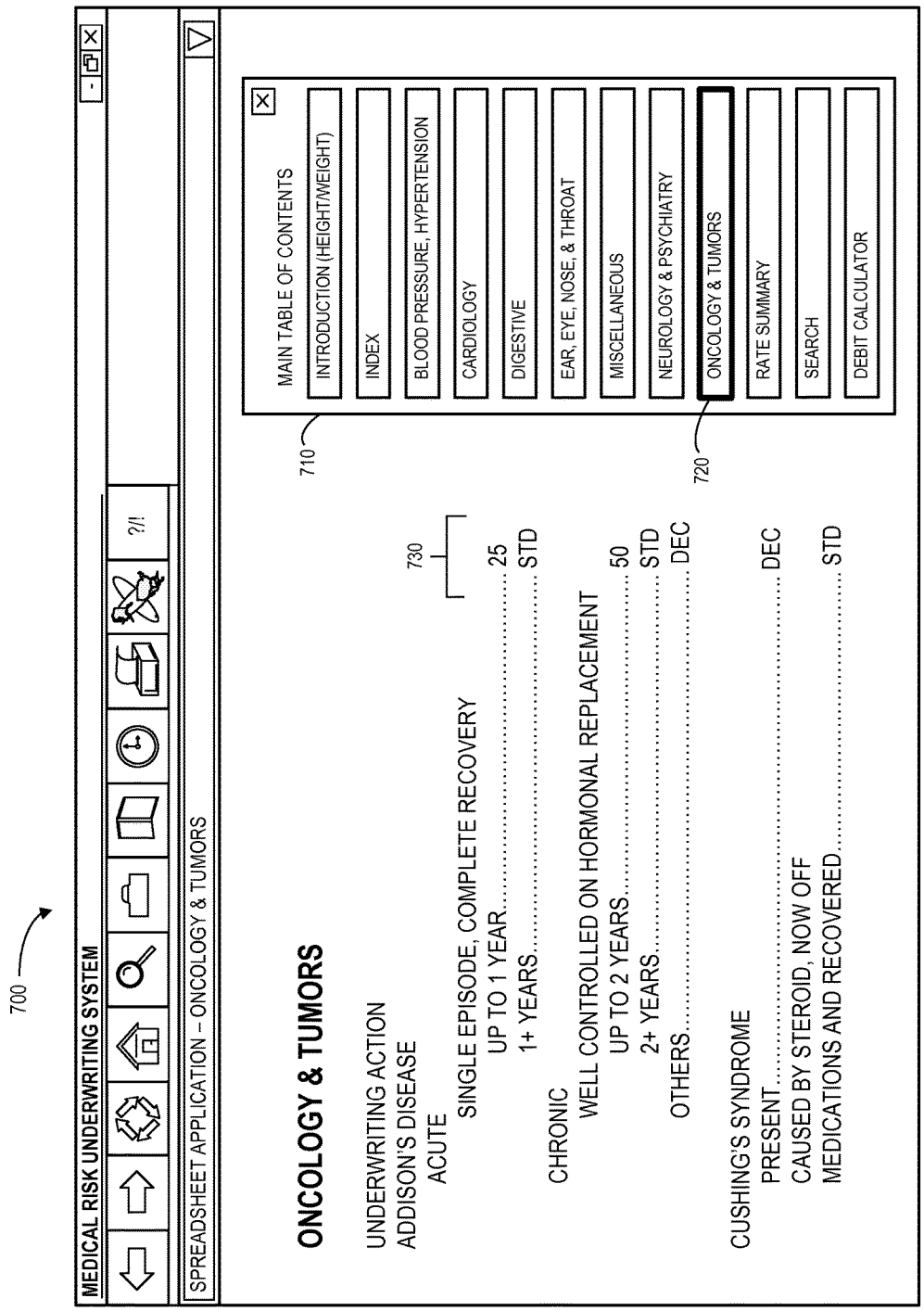
FIG. 7 is an example of an oncology and tumors display in accordance with some embodiments.

Selection of a category in the main table of contents may cause additional information about that category to be displayed. For example, FIG. 7 is an example of an oncology and tumors display 700 that may appear when the underwriter selects the "Oncology & Tumors" category 720 in the main table of contents 710. In accordance with some embodiments, detailed information about different types of medical conditions within that category may be displayed along with medical risk information 730 that may be used by the underwriter. The medical risk information 730 may, for example, indicate a particular type of disease has a standard level of risk ("STD"), an increased level of risk associated with a debit value, or that level of risk is unacceptable and the application should be declined ("DEC").

The amount of risk associated with debit values may be accumulated (in connection with the various medical illnesses an applicant has). For example, FIG. 8 is an example of a rate summary display 800 that may appear when the underwriter selects the "Rate Summary" category 820 in the main table of contents 810. In accordance with some embodiments, detailed information about different types of medical conditions associated with the applicant may be displayed along with medical risk information 830 that may be used by the underwriter. Moreover, an overall level of risk may be reflected in the "Cumulative Debit" displayed on the rate summary display 800.

Figure 9:
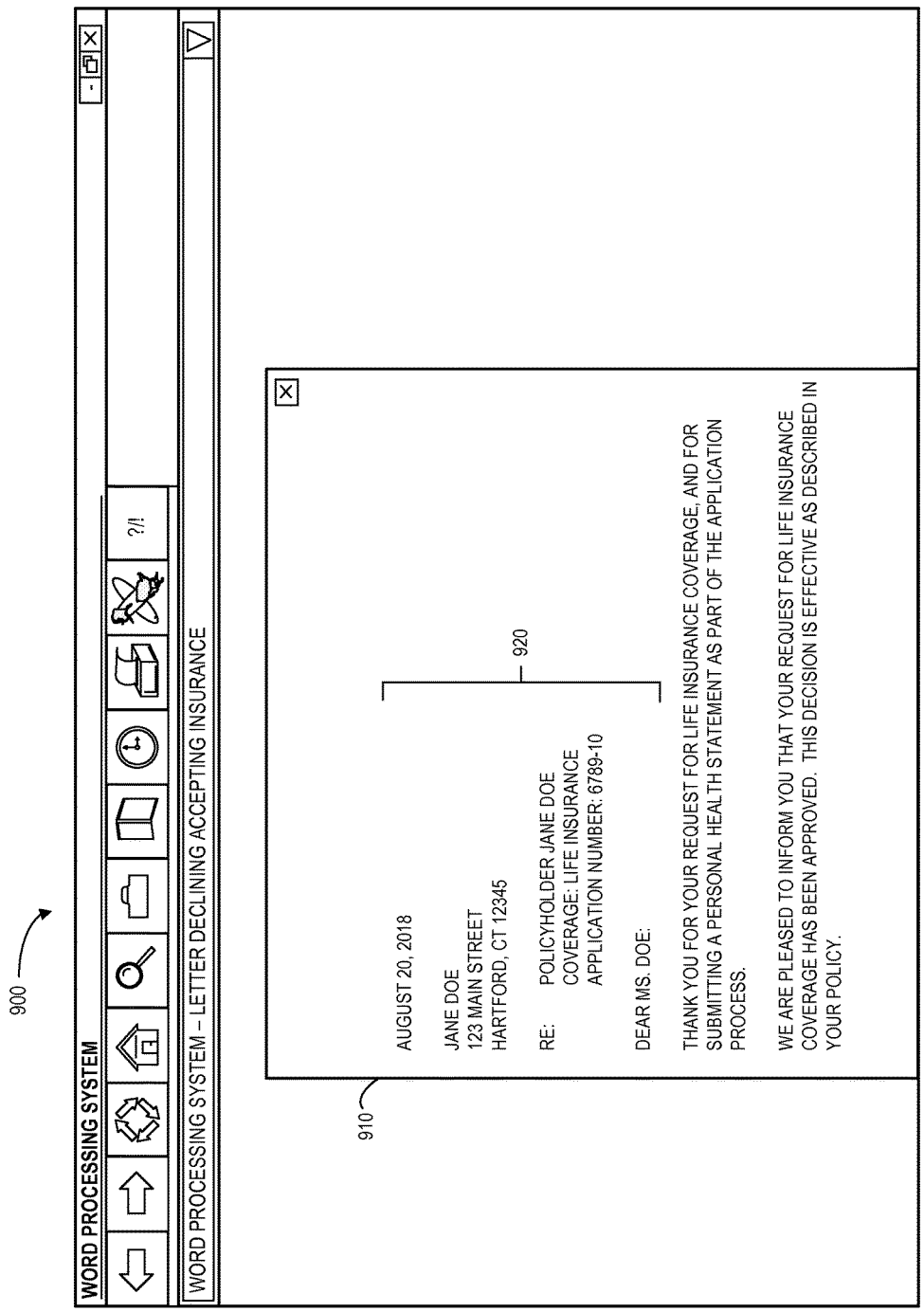
FIG. 9 is an example of a word processor document display in accordance with some embodiments.

According to some embodiments, the cumulative debit displayed on the rate summary display 800 may be used by the system or underwriter to ultimately determine that the insurance policy application should be accepted or that level of risk is unacceptable and the application should be declined. Moreover, based on the recommended underwriting decision, the system may automatically use a template in an external word processing application to automatically create a customized decision document including at least some of the potential insurance policy data. For example, FIG. 9 is an example of a word processor document display 900 in accordance with some embodiments. In particular, the display 900 includes a document 910 comprising a letter to the applicant informing him or her that the insurance policy application has been accepted. Note that the automatically generated document 910 may automatically induce information about the applicant 920 as appropriate. A similar document 910 could be generated for applicants who are denied insurance. In either case, the underwriter might manually adjust the automatically generated document 910 as appropriate.

Figure 10:
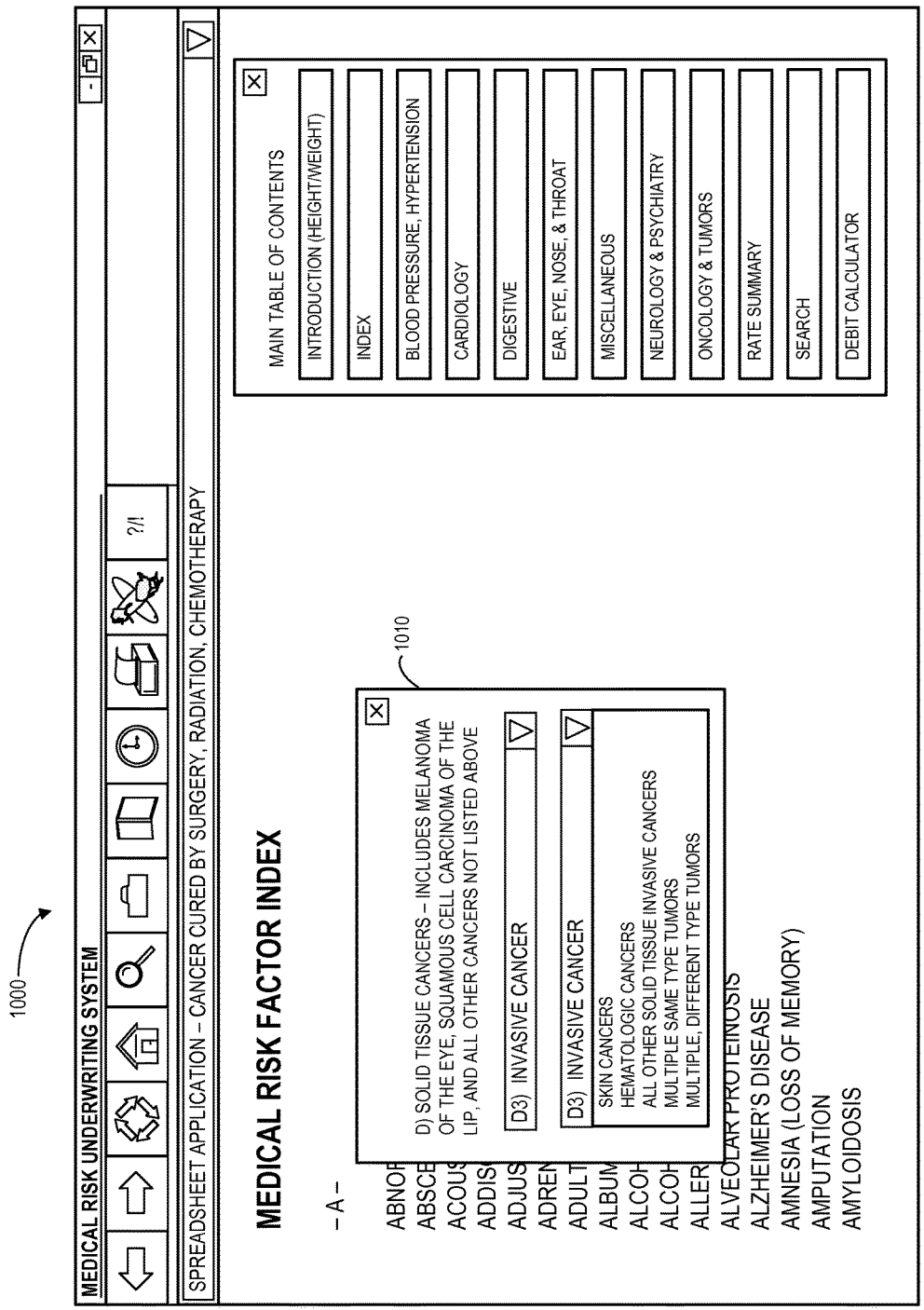
FIG. 10 is an example of solid tissue cancer display according to some embodiments.

The medical risk factor underwriting system may let the underwriter select and/or view information about specific subsets of medical risk factor information. For example, FIG. 10 is an example of solid tissue cancer display 1000 according to some embodiments. A selection pop-up window 1010 may be used by the underwriter to select various subsets of solid tissue invasive cancers (e.g., skin cancers, hematologic cancers, etc.). According to so embodiments, the display of information from a medical risk factor storage unit is performed based on a text characteristic of the medical risk factor data. For example, all text having a font size of 12 indented to a certain column within a particular portion of the spreadsheet (or text that is indented to a specific column) might be used to populate the selection pop-up window 1010.

Figure 11:
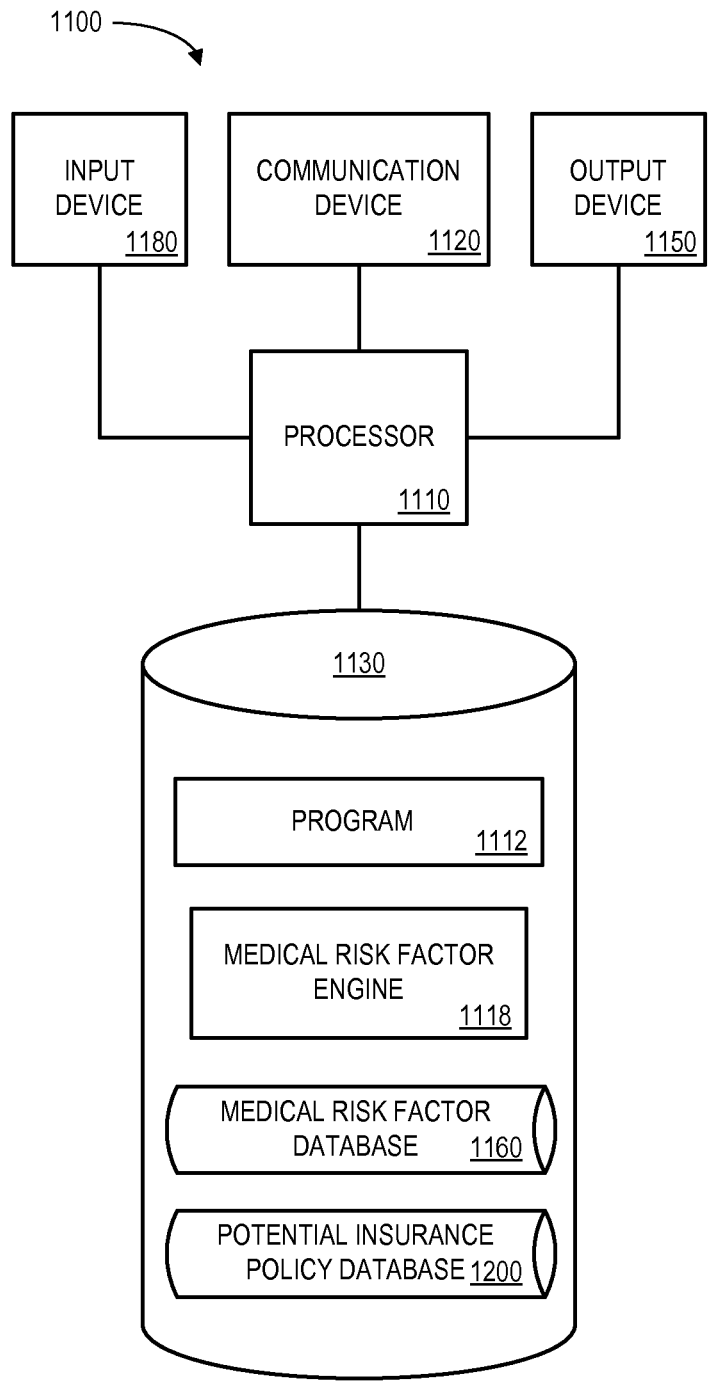
FIG. 11 is block diagram of a medical risk underwriting tool or platform according to some embodiments of the present invention.

The embodiments described herein may be implemented using any number of different hardware configurations. For example, FIG. 11 illustrates a medical risk underwriting system 1100 that may be, for example, associated with the system 100 of FIG. 1. The medical risk underwriting system 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with external devices. The medical risk underwriting system 1100 further includes an input device 1180 (e.g., a mouse, a keyboard, a touch screen, or a microphone associated with an underwriter to receive information about an applicant's health) and an output device 1150 (e.g., to output reports and the medical risk factor information). Note that the medical risk underwriting system 1100 might be associated with an insurer.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a medical risk factor engine 1118 for controlling the processor 1110. The processor 1110 performs instructions of the programs 1112, 1118, and thereby operates in accordance with any of the embodiments described herein. For example, the processor 1110 may display medical risk factor information and receive information associated with an insurance policy, having an insurance policy identifier, from an underwriter along with a plurality of medical risk factor values for the insurance policy. The plurality of medical risk factor values may be stored by the processor 1110 into an insurance policy storage unit in association with the insurance policy identifier. An overall risk level associated with the insurance policy may be automatically calculated by the processor 1110 based on the plurality of medical risk factor values, a file may be locally saved associating the overall risk level with the insurance policy identifier and/or the plurality of medical risk factor values, and an indication of the overall risk level may be transmitted from the processor 1110.

The programs 1112, 1118 may be stored in a compressed, uncompiled and/or encrypted format. The programs 1112, 1118 may furthermore include other program elements, such as an operating system, a database management system, and/or device drivers used by the processor 1110 to interface with peripheral devices.

As used herein, information may be "received" by or "transmitted" to, for example: (i) the medical risk underwriting system 1100 from another device; or (ii) a software application or module within the medical risk underwriting system 1100 from another software application, module, or any other source.

In some embodiments (such as shown in FIG. 11), the storage device 1130 further stores a medical risk factor database 1160 (e.g., containing information about various medical disorders and associated risks) and a potential insurance policy database 1200 (e.g., to store information about one or more potential insurance policies). An example of a database that may be used in connection with the medical risk underwriting system 1100 will now be described in detail with respect to FIG. 12. Note that the database described herein is only one example, and additional and/or different information may be stored therein. Moreover, various databases might be split or combined in accordance with any of the embodiments described herein. For example, the medical risk factor database 1160 and/or potential insurance policy database 1200 might be combined and/or linked to each other within the medical risk factor engine 1118.

Figure 12:
FIG. 12 is a tabular portion of a potential insurance policy database according to some embodiments.

Referring to FIG. 12, a table is shown that represents a potential insurance policy database 1200 that may be stored at the medical risk underwriting system 1100 according to some embodiments. The table may include, for example, entries identifying different insurance parameters entered into or calculated by the medical risk underwriting system 1100 and may, according to some embodiments, be associated with a spreadsheet application. The table may also define fields 1202, 1204 for each of the entries. The fields 1202, 1204 may, according to some embodiments, specify: a potential insurance policy parameter 1202 and a parameter value 1204. The potential insurance policy database 1200 may be created and updated, for example, as information is received from an underwriter and/or as calculations are performed by the medical risk underwriting system 1100.

The potential insurance policy parameter 1202 may be, for example, a unique alphanumeric code identifying a particular input or output parameter associated with the medical risk underwriting system 1100, and the parameter value 1204 may store the current value of that parameter. The illustration of FIG. 12 generally includes information such as an applicant's name, date of birth, gender, BMI value, total debits, total credits, and decision. Although the example of FIG. 12 illustrates a single potential insurance policy, the database 1200 may store information about a number of different potential policies, such as by associating each potential policy with a policy number, a potential policyholder name, a potential applicant name, a client name, and/or a client number.

Figure 13:
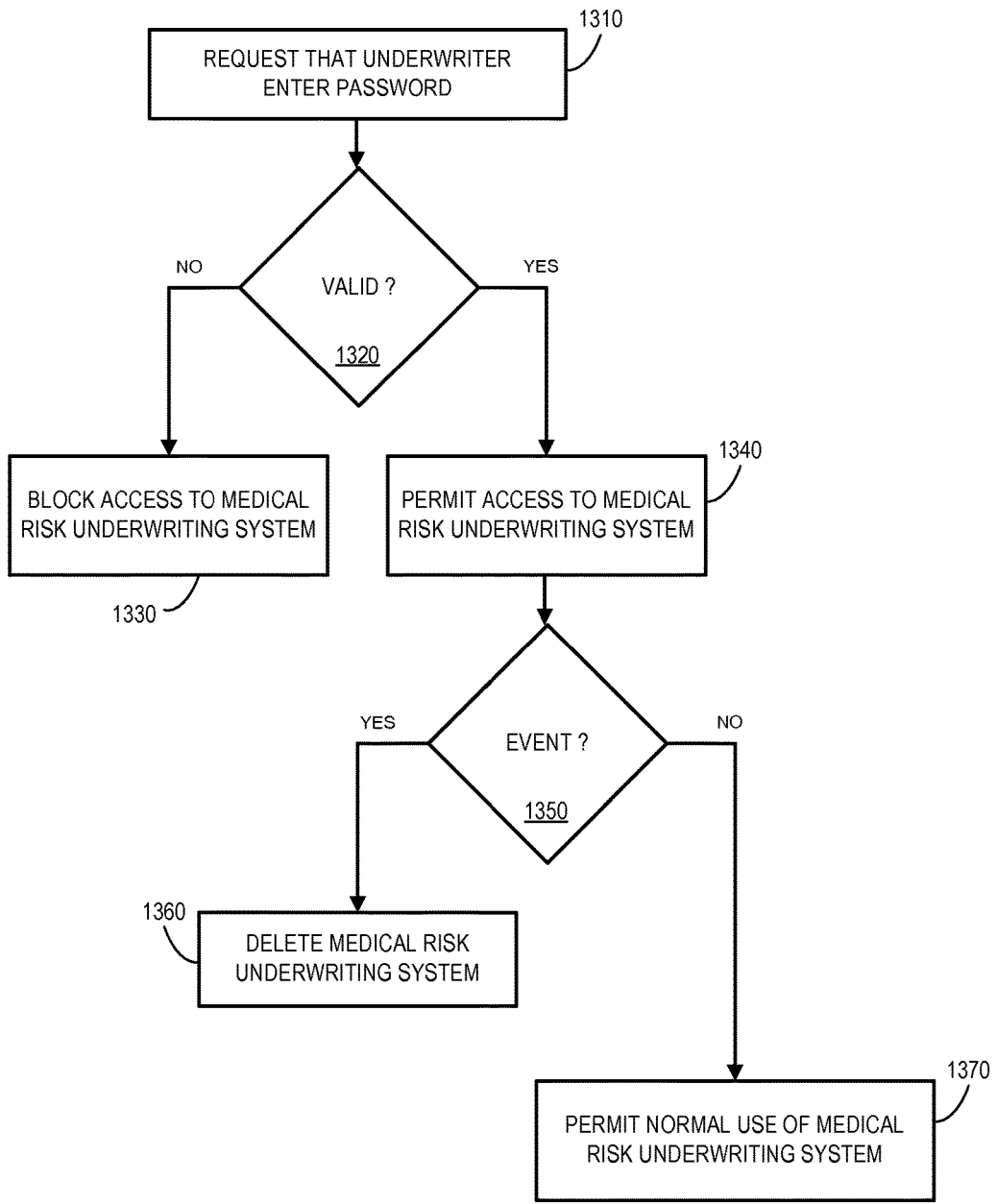
FIG. 13 illustrates a security method that might be performed in accordance with some embodiments.

Note that the sensitive nature of the information processed by the medical risk underwriting system may call for security measures. For example, an insurer might want to avoid transmitting this type of information via the Internet. As a result, some embodiments described herein may execute as a standalone application on the underwriter's computing system. Moreover, the application, such as a spreadsheet application, may be password protected with a time sensitive password function. Moreover, the system may be further adapted to automatically delete spreadsheet application information upon occurrence of a pre-determined event. For example, FIG. 13 illustrates a security method that might be performed in accordance with some embodiments. At 1310, the system requests that the underwriter provide a password. FIG. 14 is an example of password display 1400 in accordance with some embodiments. In particular, the system may ask for the password via a pop-up window 1410 which, may, according to some embodiments, further display time-sensitive warnings.

If the password is not valid at 1320, the system blocks access to the medical underwriting system at 1330. If the password is valid at 1320, the system permits access to the medical underwriting system at 1340. The system then determines if a pre-determine event has occurred at 1350 (e.g., has more than one year gone by since the password was issued?). If the event has occurred at 1350, some or all of the medical risk underwriting system is deleted at 1360. If the event has not occurred at 1350, the underwriter is allowed normal use of the medical risk underwriting system at 1370.

Note that the present invention provides significant technical improvements to facilitate medical risk underwriting decisions for an insurance policy. The present invention is directed to more than merely a computer implementation of a routine or conventional activity previously known in the industry as it significantly advances the technical efficiency, access and/or accuracy underwriting calculations by implementing a specific new method and system as defined herein. The present invention is a specific advancement in the area of medical risk underwriting by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized insurance, client and/or vendor systems, networks and subsystems. For example, in the present invention specialized and detailed medial risk factor information may be accessed to determine an appropriate underwriting decision.

Figure 15:
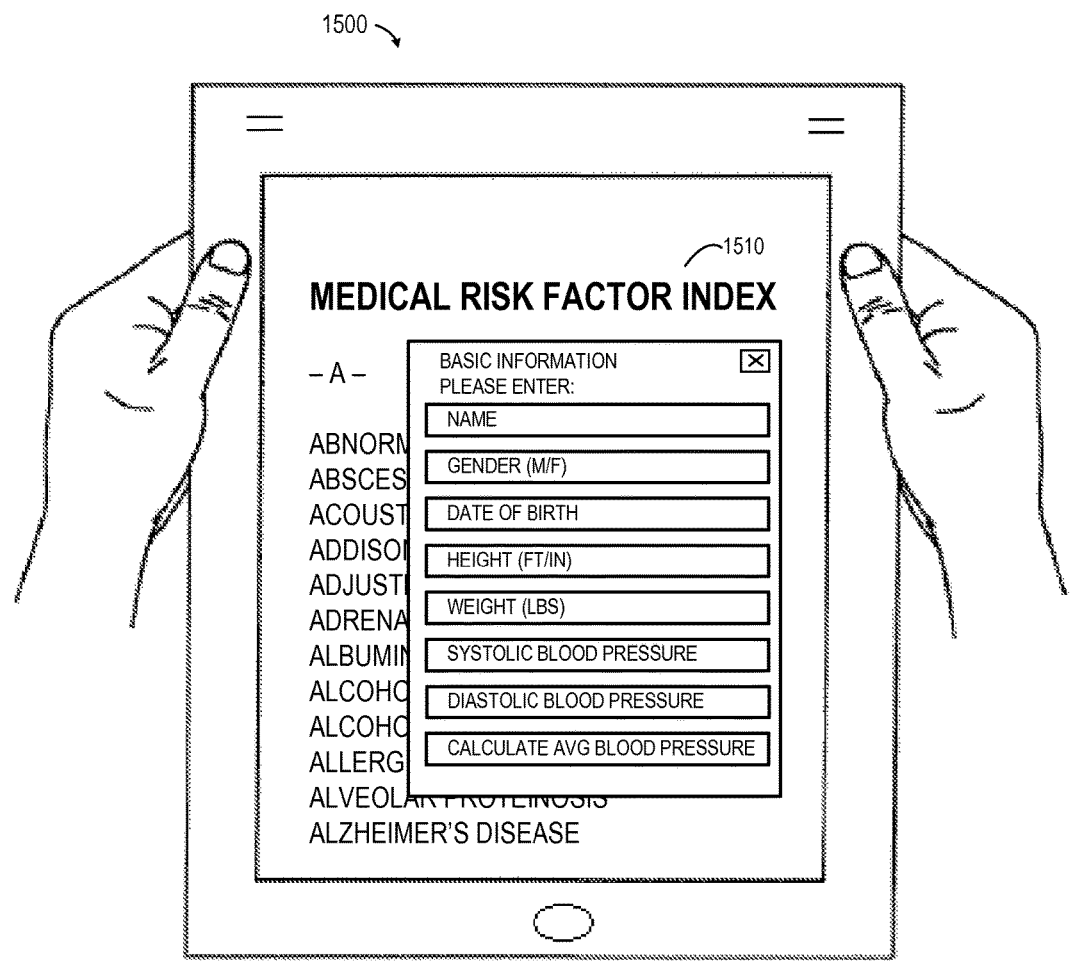
FIG. 15 illustrates a handheld tablet displaying medical risk underwriting information according to some embodiments described herein.

Although specific hardware and data configurations have been described herein, note that any number of other configurations may be provided in accordance with embodiments of the present invention (e.g., some of the information associated with the databases described herein may be combined or stored in external systems). Additionally, one or more of the elements described herein may be practiced in a distributed cloud computing environment where tasks are performed by logically or physically remote processing devices that are linked through one or more communications networks. For example, FIG. 15 illustrates a handheld tablet 1500 displaying medical risk underwriting information according to some embodiments described herein. In particular, the handheld tablet 1500 is displaying medical risk factor underwriting data 1510.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A standalone medical risk underwriting computer system comprising:
    a medical risk factor computer storage unit for receiving, storing, and providing medical risk factor data;
    a policy storage unit for receiving, storing, and providing policy data;
    a processor co-located with and coupled to the risk factor computer storage unit and the policy data storage unit, wherein the processor is configured to:
        generate a first graphical interface to receive a password to access the standalone medical risk underwriting computer system;
        responsive to receipt of an invalid password, block access to the standalone medical risk underwriting computer system;
        responsive to receipt of a valid password, determine whether a predetermined event, comprising expiration of a period of time since issuance of the password greater than a predetermined period of time, has occurred;
        responsive to a determination that the predetermined event has occurred, delete at least some data stored on components of the standalone medical risk underwriting computer system;
        responsive to a determination that the predetermined event has not occurred:
            receive information associated with a policy having a policy identifier,
            generate a second graphical interface including an index of selectable medical risk factors;
            responsive to receipt of a selected medical risk factor, generate and display a suggested medical risk value corresponding to the selected medical risk factor;
            determine whether an adjustment to the suggested medical risk value was received;
            responsive to a determination that the adjustment to the suggested medical risk value was received, store the adjusted medical risk value;
            responsive to a determination that the adjustment to the suggested medical risk value was not received, store the suggested medical risk value;
            repeat the steps of displaying suggested medical risk values for a plurality of selected medical risk factors and storing one of the adjusted medical risk value of the suggested medical risk value corresponding to each of the selected medical risk factors;
            automatically calculate an overall risk level associated with a policy based on the plurality of selected medical risk factor values, and
            locally save at least one file associating the overall risk level with at least one of the policy identifier and the plurality of medical risk factor values;
            automatically generate a recommended underwriting decision based on the overall risk level;
            automatically create, by a template in an external application based on the recommended underwriting decision, a customized decision document including at least some of the policy data; and
            transmit, by a communication device, the calculated overall risk level, but not the plurality of medical risk factor values, to an agent computing device.

2. The system of claim 1, wherein policy is associated with at least one of: (i) a new potential life insurance policy, (ii) a life insurance policy renewal, and (iii) a group life insurance policy.

3. The system of claim 1, wherein the overall risk level is associated with at least one of: (i) an overall risk score, (ii) an overall risk category, (iii) an amount of risk credits, and (iv) an amount of risk debits.

4. The system of claim 1, wherein the medical risk factor computer storage unit, the policy storage unit, and the processor are associated with a spreadsheet application.

5. The system of claim 4, wherein the processor being configured to generate a second graphical interface including an index of selectable medical risk factors comprises the processor being configured to display information from the medical risk factor storage unit based on a text characteristic of the medical risk factor data.

6. The system of claim 5, wherein the text characteristic comprises at least one of: (i) a font, (ii) a font size, (iii) bold text, (iv) underlined text, (v) italicized text, (vi) a text color, and (vii) a text indentation.

7. The system of claim 1, wherein the policy identifier is associated with at least one of: (i) a policy number, (ii) a potential policyholder name, (iii) a potential applicant name, (iv) a client name, (v) a date of data entry, (vi) a date of a file save, (vii) a date of birth, and (viii) a client number.

8. A computerized method comprising:
    generating, by a processor of a standalone medical risk underwriting computer system, a first graphical interface to receive an underwriting computer system password;
    responsive to receipt of a valid password, determining, by the processor, whether a predetermined event has occurred;
    responsive to a determination that predetermined event, comprising expiration of a period of time since issuance of the password greater than a predetermined period of time, has occurred, deleting, by the processor, at least some data stored on components of the medical risk underwriting computer system;

responsive to a determination that the predetermined event has not occurred:

receiving, by the processor, information associated with a potential policy having a policy identifier;

generating, by the processor, a second graphical interface including an index of selectable medical risk factors;

responsive to receipt of a selected medical risk factor, generating and displaying, by the processor, a suggested medical risk value corresponding to the selected medical risk factor;

determining, by the processor, whether an adjustment to the suggested medical risk value was received;

responsive to a determination that the adjustment to the suggested medical risk value was received, storing, by the processor, the adjusted medical risk value;

responsive to a determination that the adjustment to the suggested medical risk value was not received, storing, by the processor, the suggested medical risk value;

repeating the steps of displaying suggested medical risk values for a plurality of selected medical risk factors and storing one of the adjusted medical risk value of the suggested medical risk value corresponding to each of the selected medical risk factors;

locally storing, by the processor, the plurality of medical risk factor values into a policy storage unit in association with the policy identifier;

automatically calculating, by the processor, an overall risk level associated with the policy based on the plurality of medical risk factor values;

automatically generating, by the processor, a recommended underwriting decision based on the overall risk level;

automatically creating, by a template in an external application based on the recommended underwriting decision, a customized decision document including at least some of the policy data; and transmitting, by a communication device by the processor to an agent computing device, an indication of the overall risk level but not the plurality of medical risk factor values.

9. The method of claim 8, wherein the overall risk level is associated with at least one of: (i) an overall risk score, (ii) an overall risk category, (iii) an amount of risk credits, and (iv) an amount of risk debits.

10. The method of claim 8, wherein the standalone medical risk underwriting system is associated with a spreadsheet application, and the displaying the second graphical interface including the index of selectable medical risk factors-is performed based on a text characteristic of the medical risk factor data, the characteristic comprising at least one of: (i) a font, (ii) a font size, (iii) bold text, (iv) underlined text, (v) italicized text, (vi) a text color, and (vii) a text indentation.

11. A medical risk underwriting computer system associated with processing risk factor data, the system comprising:

a medical risk factor computer storage unit for receiving, storing, and providing medical risk factor data;

a policy storage unit for receiving, storing, and providing potential policy data;

a processor, executing a spreadsheet application, co-located with and coupled to the medical risk factor computer storage unit and the policy storage unit, wherein the processor is configured to:

generate a first graphical interface to receive an underwriting computer system password;

responsive to receipt of an invalid password, block access to the underwriting computer system;

responsive to receipt of a valid password, determine whether a predetermined event, comprising expiration of a period of time since issuance of the password greater than a predetermined period of time, has occurred;

responsive to a determination that the predetermined event has occurred, delete at least some data stored on components of the medical risk underwriting computer system;

responsive to a determination that the predetermined event has not occurred:

receive information associated with a policy having a policy identifier;

generate a second graphical interface including an index of selectable medical risk factors, the second graphical interface displaying information from the medical risk factor computer storage unit based on a text characteristic of the medical risk factor data, the text characteristic comprising at least one of: (i) a font, (ii) a font size, (iii) bold text, (iv) underlined text, (v) italicized text, (vi) a text color, and (vii) a text indentation, responsive to receipt of a selected medical risk factor, generate and display a suggested medical risk value corresponding to the selected medical risk factor;

determine whether an adjustment to the suggested medical risk value was received;

responsive to a determination that the adjustment to the suggested medical risk value was received, store the adjusted medical risk value;

responsive to a determination that the adjustment to the suggested medical risk value was not received, store the suggested medical risk value;

repeat the steps of displaying suggested medical risk values for a plurality of selected medical risk factors and storing one of the adjusted medical risk value of the suggested medical risk value corresponding to each of the selected medical risk factors;

locally store the plurality of medical risk factor values into the policy storage unit in association with the potential policy identifier, automatically calculate an overall risk level associated with the potential policy based on the plurality of medical risk factor values, transmit, by a communication device to an agent computing device, an indication of the overall risk level, automatically generate a recommended underwriting decision based on the overall risk level; and automatically create, by a template in an external application based on the recommended underwriting decision, a customized decision document including at least some of the policy data.

12. The system of claim 11, wherein the overall risk level is associated with at least one of: (i) an overall risk score, (ii) an overall risk category, (iii) an amount of risk credits, and (iv) an amount of risk debits.

* * * * *